United States Patent Office 3,637,788
Patented Jan. 25, 1972

3,637,788
PROCESS FOR PRODUCING ISOTHIOCYANATES
Peter J. Werth, Jr., Orange, and Anthony R. Di Napoli, Cheshire, Conn., assignors to The Upjohn Company, Kalamazoo, Mich.
No Drawing. Filed July 19, 1968, Ser. No. 745,995
Int. Cl. C07c *161/04*
U.S. Cl. 260—454
4 Claims

ABSTRACT OF THE DISCLOSURE

A novel process is described for converting a primary amine to the corresponding isothiocyanate via the intermediate ammonium dithiocarbamate. The latter is prepared by reacting the amine with carbon disulfide in the presence of ammonium hydroxide in accordance with conventional methods and the dithiocarbamate is reacted with nitrous acid, advantageously formed in situ, at a pH not less than 5.0 to obtain the desired isothiocyanate. Advantages of the novel process are high yield, use of low cost reactants, and ease of operation.

BACKGROUND OF THE INVENTION

(1) Field of the invention

This invention relates to a novel process for the preparation of isothiocyanates and is more particularly concerned with a process for the conversion of primary amines to the corresponding isothiocyanates via the intermediate formation of the ammonium salt of the corresponding dithiocarbamic acids.

(2) Description of the prior art

Various methods of making isothiocyanates are known in the art. For example, Dieckmann et al. Ber. 40, 3737 (1907) describe the reaction of a primary amine with thiophosgene to yield the corresponding isothiocyanate. The method is of wide applicability but requires the use of the toxic, volatile and expensive thiophosgene.

Campbell et al., Journal of Applied Polymer Science, 2, 81 (1959), prepared isothiocyanates by reacting a primary amine with carbon disulfide and ammonium hydroxide to obtain the corresponding ammonium dithiocarbamate and treating the latter with a mercury or lead salt. The preparation of the intermediate ammonium dithiocarbamate from the appropriate amine followed by reaction of the dithiocarbamate with an oxidizing agent such as sodium hypochlorite or sodium chlorite is a common route to isothiocyanates; see, for example, U.S. Pats. 2,859,235, 2,859,236, 2,886,584, and 3,234,254. These latter methods, although giving satisfactory yields, have the disadvantage that they are carried out at high dilution in aqueous systems and, accordingly, are not economical when used on the manufacturing scale.

Other methods for the preparation of isothiocyanates include the synthesis from thioureas. For example, Beilstein, 12, 453, Fourth Edition, shows the formation of phenyl isothiocyanate by heating N,N'-diphenylurea with hydrochloric acid. Such methods suffer the disadvantage of low yield and nonavailability of the starting thioureas which are, indeed, commonly made from the corresponding isothiocyanate in the first place.

We have now found an improved method of converting primary amines to the corresponding isothiocyanates via the intermediate formation of the ammonium salts of the corresponding dithiocarbamates. Our novel method enables the conversion to be carried out without the necessity to employ large volumes of water in the second stage of the reaction. Our method gives rise to the desired isothiocyanates in high yield and employs relatively inexpensive reactants throughout the conversion. Other advantages will be apparent to one skilled in the art as the description of the novel process proceeds herein.

SUMMARY OF THE INVENTION

Our invention consists in a process for the conversion of an organic primary amine to the corresponding isothiocyanate which process comprises reacting said primary amine with carbon disulfide in the presence of an inorganic hydroxide selected from the class consisting of alkali metal hydroxides and ammonium hydroxide and reacting the dithiocarbamate salt so obtained with nitrous acid at a pH not less than 5.0.

DETAILED DESCRIPTION OF THE INVENTION

The process of the invention can be applied to any organic primary amine i.e. the starting amine can be any hydrocarbyl primary amine the sole limitation on the starting material being that it be free from substituents such as amino, which would enter into reaction with the nitrous acid employed in the second stage of the process of the invention, or would enter into reaction with the isothiocyanato group formed in the process of the invenion. Examples of hydrocarbyl primary amines which can be employed as starting materials in the process of the invention are alkylamines such as methylamine, ethylamine, isopropylamine, butylamine, hexylamine, octylamine, decylamine, dodecylamine, and the like; alkenylamines such as allylamine, 2-butenylamine, 1-hexenylamine, 3-heptenylamine, 2-octenylamine, 3-decenylamine, 2-dodecenylamine, and the like; cycloalkylamines such as cyclobutylamine, cyclopentylamine, cyclohexylamine, cycloheptylamine, cyclooctylamine, and the like; cycloalkenylamines such as cyclopentenylamine, cyclohexenylamine, cycloheptenylamine, cyclooctenylamine, and the like; aralkylamines such as benzylamine, 2-phenethylamine, 3-phenylpropylamine, α-naphthylmethylamine, and the like; and arylamines such as aniline, o-, m-, and p-toluidine, o-, m-, and p-xylidine, 4-diphenylylamine, α-naphthylamine, β-naphthylamine, and the like. The hydrocarbyl moiety of the hydrocarbyl primary amines employed as starting materials can be unsubstituted or can be substituted by inert groups, i.e. groups which do not interfere in any way with the course of the reaction, such as halo, alkyl, alkoxy, nitro, cyano, alkylsulfonyl, alkenyl, and the like; wherein alkyl and alkenyl and the alkyl moiety of alkoxy and alkyl sulfonyl are as hereinbefore defined.

While the process of the invention is of broad applicability and can be applied to the conversion of any hydrocarbyl primary amine to the corresponding isothiocyanate the process is of particular applicability to the conversion of primary alkylamines to the corresponding alkyl isothiocyanates.

In carrying out the process of the invention, the conversion of the starting primary organic amines to a salt of the corresponding dithiocarbamic acid in the first step of the reaction is carried out substantially in accordance with procedures well-known in the art; see, for example, U.S. Pats. 2,859,235, and 2,859,236. Illustratively, the primary amine is reacted with carbon disulfide in the presence of the alkali metal or ammonium hydroxide, the amine being added directly to a mixture of the carbon disulfide and inorganic hydroxide.

Advantageously, the reaction is carried out in the presence of an inert solvent. In the case of amines having good water solubility, particularly the alkylamines, the inert solvent employed in the process of the invention can be, and preferably is, water. In the case of those amines which do not have any appreciable solubility in water, the inert solvent can be any inert organic solvent i.e. an organic solvent which does not enter into reaction with, or interfere in any way with, any of the reactants used in either stage of the process of the invention. Examples of inert organic solvents are benzene, toluene, xylene, chlorobenzene, 1,2-dichlorobenzene, 1,3,4-trichlorobenzene, petroleum ether, ligroin, pentane, hexane, octane, methylene dichloride, ethyl chloride, chloroform, tetrachloroethane, and the like.

In a preferred embodiment of the first step of the process of the invention the primary amine, either as such or as a solution in inert solvent (water preferred) is added to a mixture of carbon disulfide and alkali metal or ammonium hydroxide in inert solvent (water preferred). The addition is made at such a rate that the temperature of the reaction mixture can be maintained, with the aid of external cooling, at a value not higher than about 50° C. The amount of inert solvent employed in the process is not critical. Generally speaking, it is convenient to employ an amount of inert solvent such that the total amount of reactants present represents from about 5 percent to about 25 percent by weight although higher or lower concentrations of reactants can be employed in any particular case.

The reaction taking place during this step of the process of the invention can be represented by the following equation:

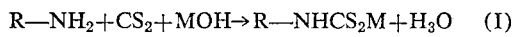

$$R\text{—}NH_2 + CS_2 + MOH \rightarrow R\text{—}NHCS_2M + H_2O \quad (I)$$

wherein R represents the hydrocarbyl moiety of the starting primary amine and M represents an alkali metal cation or an ammonium ion. As will be seen from Equation I above, the reaction requires equimolar proportions of the three reactants. Accordingly this is the preferred proportion in which the reactants are employed. An excess of one or more reactants can be employed if desired but such an excess contributes no significant advantage as far as the overall result, in terms of yield and ease of reaction, is concerned.

The reaction represented by the Equation I gives rise to the alkali metal or ammonium salt of the dithiocarbamic acid corresponding to the starting primary amine. When water is employed as the reaction solvent in this first stage of the reaction the dithiocarbamate salt generally remains in solution, depending upon the concentration of said salt in the reaction mixture. When an inert organic solvent, such as those exemplified above, is employed as reaction solvent in the first stage of the reaction, the dithiocarbamate salt generally separates as a solid suspension. In the former case the aqueous solution of the dithiocarbamate salt can be used, without further treatment, in the second stage of the process of the invention. However, when an inert organic solvent has been used as reaction solvent in the first stage of the process of the invention it is preferable that water be added to the reaction mixture or that the precipitated dithiocarbamate salt be separated, as by filtration, decantation, and the like procedures, and that the isolated salt be suspended or dissolved in water before being subjected to the second stage of the process of the invention. In a preferred embodiment, water is added to the inert organic solvent suspension of dithiocarbamate, or organic solvent is added to the aqueous suspension of dithiocarbamate, depending upon which solvent has been used in the first step of the process, and the second step of the process is carried out in the presence of the organic solvent which then serves to extract the desired isothiocyanate from the final reaction product.

In said second stage of the process of the invention the dithiocarbamate salt in aqueous solution or suspension is treated with nitrous acid under very carefully controlled conditions. The nitrous acid is preferably generated in situ for example by adding nitrogen tetroxide to the aqueous reaction mixture or by adding an alkali metal nitrite such as sodium nitrite, potassium nitrite, and the like to the reaction mixture containing the dithiocarbamate salt, and then treating the resulting mixture with aqueous mineral acid, preferably hydrochloric acid.

It is essential that the mineral acid be added to the reaction mixture in such a manner and at such a rate that the pH of said reaction mixture does not fall below about 5.0 until the conversion of dithiocarbamate salt to isothiocyanate is substantially complete. The latter end point is readily detected by a sudden drop in pH. Generally speaking the point at which this occurs is that at which there has been added the substantially theoretical amount of mineral acid necessary to generate 1 mole of nitrous acid for each mole of dithiocarbamate salt present in the initial reaction mixture. However, in certain cases it has been observed that the above end point is reached when the amount of mineral acid added is as little as that required to generate 0.5 mole of nitrous acid per mole of dithiocarbamate.

Failure to observe the critical requirement of pH value during the second step of the process of the invention results in loss of yield of the desired isothiocyanate accompanied by production of substantial amounts of undesired by-products such as the tetrathiuram disulfide corresponding to the dithiocarbamic acid intermediate.

The temperature at which the generation of nitrous acid is carried out in the second step can vary over wide limits. Said temperature is generally less than about 60° C. Advantageously said temperature should be controlled, by suitable application of external cooling, within the range of about 0° C. to about 25° C. and preferably within the range of about 0° C. to about 5° C.

When the reaction of dithiocarbamate has been completed, as determined by the sudden drop in pH discussed above, the desired isothiocyanate is isolated from the reaction mixture by conventional procedure. For example, when the second stage of the process of the invention has been carried out in the presence of an organic solvent, the isothiocyanate produced in the reaction is present in the organic solvent layer at the end of the reaction. The isothiocyanate is isolated from said organic layer by separating the latter and removing the organic solvent therefrom by distillation. The isothiocyanate so isolated can be purified, if desired, by conventional procedures, advantageously by distillation in the case of liquid isothiocyanates or by recrystallization in the case of solid isothiocyanates.

Alternatively, when the isothiocyanate obtained in accordance with the process of the invention is to be used merely as an intermediate in a further reaction, it may not be necessary to isolate said isothiocyanate from the reaction mixture or from the organic layer which separates therefrom. For example, where the isothiocyanate is to be used in the preparation of thioureas the latter can be readily produced simply by adding the appropriate amine to the crude reaction product obtained in the second step of the process of the invention.

In the most preferred embodiment of the process of the invention, the inorganic hydroxide employed in the first step of the process is ammonium hydroxide and the intermediate dithiocarbamate salt so obtained is the ammonium salt. The use of alkali metal hydroxide in place of ammonium hydroxide in the first step of the process of the invention gives rise to the corresponding alkali metal dithiocarbamate intermediate. We have found that conversion of the latter to the corresponding isothiocyanate in the second step of the process of the invention is facilitated by inclusion in the reaction mixture of a minor proportion i.e. less than 1 mole per mole of dithiacarbamate, of ammonia or a tertiary amine such as trimethylamine, triethylamine, and like trialkylamines, pyridine, quinoline, N,N - dimethylaniline, N,N-diethylaniline and like N,N-dialkylanilines, and N,N'-dimethylpiperazine, N,N' - diethylpiperazine, and like N,N'-dialkylpiperazines.

As pointed out previously, the process of the invention has marked economic advantages over processes hitherto known, particularly those processes in which the intermediate dithiocarbamate has been treated with reagents such as sodium hypochlorite, which reagents necessitate the use of large volumes of water in the processing. Further the process of the present invention is of broad general applicability and gives rise to a high overall yield in the conversion of an organic primary amine to the corresponding isothiocyanate.

The isothiocyanates which are obtained by the process of the invention are, for the most part, known compounds. Said isothiocyanates are useful in a variety of ways. Illustratively, many of the isothiocyanates can be employed as fungicides, for example as described in British Patent 810,044, and, for this purpose, they can be formulated in ways conventional in the art to produce dusting powders, dispersible powders, aqueous dispersions and emulsions, and aerosols. The isothiocyanates are also useful as intermediates in chemical synthesis. For example, they can be reacted with ammonia and primary amines, using procedures well-known in the art, to yield the corresponding thioureas which are, in many cases, known compounds of established utility. Illustratively, N-arylthioureas, for example N,N'-diphenylthiourea prepared from phenyl isothiocyanate and aniline, are useful as stabilizing agents (against aging and exposure to heat and ultraviolet light) for reaction products of high molecular polyunsaturated compounds (natural and synthetic rubbers) and sulfur dioxide, in accordance with U.S. Pat. 2,583,370. The N-arylthioureas produced as described above are also useful as metal (copper) discoloration inhibitors in polyphosphate containing detergents in accordance with U.S. Pat. 2,698,302. The N,N'-diarylthioureas which can be prepared as described above are useful in the preparation of flotation agents in accordance with British Patent 546,232.

The following examples illustrate the best mode contemplated by the inventors for carrying out their invention but are not to be construed as limiting the scope thereof.

EXAMPLE 1

A mixture of 22 ml. (0.4 mole) of 50 percent aqueous sodium hydroxide solution and 50 ml. of water is cooled to 10° C. and a total of 24.2 ml. (0.4 mole) of carbon disulfide is added thereto with stirring. The resulting mixture is maintained at 10° C. to 15° C. while 25.7 g. (0.4 mole) of 70 percent w./w. aqueous ethylamine solution is added dropwise with stirring. The addition is complete in approximately 15 minutes. The resulting mixture is heated to 45° C. for one hour to obtain a clear solution before being cooled in an ice bath and diluted with 40 ml. of water. The resulting solution is maintained at 5° C. while 28 g. (0.4 mole) of sodium nitrite followed by 26 ml. of 29 percent w./w. ammonium hydroxide and 100 ml. of benzene are added. The mixture so obtained is stirred and the temperature thereof maintained at 5° C. to 8° C. while 36 percent w./v. hydrochloric acid solution is added dropwise. The addition is continued until the pH of the solution drops to 5.0. The total amount of hydrochloric acid added at this point is approximately 87 ml. and the time of its addition is approximately 2 hours. At the completion of the addition the benzene layer is separated and is found to contain, by vapor phase chromatography, 25.7 g. (73.8 percent yield based on ethylamine) of ethyl isothiocyanate. The benzene solution is evaporated to leave the ethyl isothiocyanate as an oily residue.

EXAMPLE 2

A mixture of 624 parts by weight (5.17 mole) of 29 percent w./v. aqueous ammonium hydroxide solution and 820 parts by weight of water is stirred while a total of 550 parts by weight (7.24 mole) of carbon disulfide is added. To the mixture is added slowly with stirring and cooling in ice water, 479 parts by weight (7.44 mole) of 70 percent w./w. aqueous ethylamine solution. When the addition is complete the resulting mixture is heated slowly to 45° C. and maintained thereat for 1 hour. At the end of this time the clear solution so obtained is cooled to 20° C. and 450 parts by weight (6.52 mole) of sodium nitrite is added followed by 700 parts by weight of toluene. The resulting mixture is stirred and maintained at 20° C. while 36 percent w./v. aqueous hydrochloric acid is added slowly until a sudden permanent drop in pH to 5.0 is observed. When this point is reached, the toluene layer is separated and is found by vapor phase chromatography to contain 550 parts (85 percent theoretical yield based on ethylamine) of ethyl isothiocyanate. The ethyl isothiocyanate is not isolated but is converted directly to ethylthiourea by adding the toluene solution slowly to 735 parts by weight of 29 percent w./v. aqueous ammonium hydroxide solution. The mixture is stirred and the temperature of the mixture is kept below 40° C. by cooling as required. When the addition is complete and the exotherm subsides the mixture is heated at 40° C. for 2 hours and then purged with nitrogen at 65° for 1 hour. The aqueous layer is separated, heated to 70° C. and filtered hot. The filtrate is cooled and the solid which separates is isolated by filtration. There is thus obtained 528 parts by weight (80.6 percent theoretical yield based on ethylamine) of ethylthiourea in the form of a white crystalline solid.

EXAMPLE 3

A mixture of 12 ml. of 50 percent w./w. (0.2 mole) of aqueous sodium hydroxide solution and 12 ml. of water is cooled to 10° C. while 13.2 ml. (0.2 mole) of carbon disulfide is added. When the addition is complete the mixture is cooled to 5° C. to 10° C. and maintained thereat while 18.6 g. (0.2 mole) of aniline is added dropwise over a period of about 20 minutes. The resulting mixture is stirred for a further 30 minutes after the addition of aniline has been completed. At the end of this time 200 ml. of ice water and 100 ml. of toluene are added followed by 14 g. (0.2 mole) of sodium nitrite and 13 ml. (0.2 mole) of 29 percent w./v. aqueous ammonium hydroxide solution. The mixture so obtained is cooled to 5° C. and treated dropwise with 36 percent w./v. hydrochloric acid until the pH of the solution shows a sudden fall to 5.0. At the end of this time the toluene layer is separated and distilled to obtain 7 g. of phenyl isothiocyanate.

EXAMPLE 4

A mixture of 11 ml. (0.2 mole) of 50 percent aqueous sodium hydroxide solution and 25 ml. of water is cooled to 10° C. and a total of 12.1 ml. (0.2 mole) of carbon disulfide is added thereto with stirring. The resulting mixture is maintained at 10° C. to 15° C. while 12.8 g. (0.2 mole) of 70 percent w./w. aqueous ethylamine solution is added dropwise with stirring. The addition is complete in approximately 15 minutes. The resulting mixture is heated to 45° C. for 1 hour to obtain a clear solution before being cooled in an ice bath and diluted with 20 ml. of water. The resulting solution is maintained at 5° C. while 14 g. (0.2 mole) of sodium nitrite, a solution of 30 g. (0.2 mole) of triethanolamine in 50 ml. of water, and 100 ml. of benzene are added successively. The mixture so obtained is stirred and maintained at about 5° C. while 36 percent w./v. aqueous hydrochloric acid solution is added dropwise until the pH of the mixture shows a sudden drop to about 5.0. At this time the benzene layer is separated and is found by vapor phase chromatography to contain 14.9 g. (85.6 percent theoretical based on ethylamine) of ethylisothiocyanate. The latter is isolated as an oil by evaporation of the benzene.

EXAMPLE 5

Using the procedure described in Example 1, but replacing ethylamine by butylamine, there is obtained butyl isothiocyanate. Similarly, using the procedure described in Example 1, but replacing ethylamine by methylamine, allylamine, 2-hexenylamine, octylamine, cyclohexylamine, cyclohexenylamine or benzylamine, there are obtained methyl isothiocyanate, allyl isothiocyanate, 2-hexenyl isothiocyanate, octyl isothiocyanate, cyclohexyl isothiocyanate, cyclohexenyl isothiocyanate, and benzyl isothiocyanate, respectively.

EXAMPLE 6

Using the procedure described in Example 3, but replacing aniline by p-toluidine, there is obtained p-tolyl isothiocyanate.

Similarly, using the procedure described in Example 3, but replacing aniline by α-naphthylamine, β-naphthylamine, 4-diphenylylamine or m-toluidine, there are obtained α-naphthyl isothiocyanate, β-naphthyl isothiocyanate, 4-diphenylyl isothiocyanate, and m-tolyl isothiocyanate, respectively.

We claim:

1. A process for the preparation of ethyl isothiocyanate which comprises reacting ammonium N-ethyldithiocarbamate in aqueous medium with from about 0.5 mole to about 1 mole, per mole of dithiocarbamate, of nitrous acid at a pH between 5.0 and the initial pH of the reaction mixture and at a temperature within the range of about 0° C. to about 25° C.

2. The process of claim 1 wherein the reaction is carried out in the presence of an inert organic solvent.

3. The process of claim 2 wherein the inert organic solvent is benzene.

4. The process of claim 2 wherein the inert organic solvent is toluene.

References Cited

UNITED STATES PATENTS

| 2,595,723 | 5/1952 | Spiegelberg et al. | 260—454 |
| 2,859,235 | 11/1958 | Schmidt et al. | 260—454 |
| 3,234,254 | 2/1966 | Soder et al. | 260—454 |

FOREIGN PATENTS

| 1,024,913 | 4/1966 | Great Britain | 260—454 |

OTHER REFERENCES

Gould, "Inorganic Reactions and Structure" (1959), pp. 239–40, Henry Holt & Co., New York.

Senter "A Textbook of Inorganic Chem." (1919), 5th Ed., pp. 230–36, Methuen & Co. Ltd., London, D. Van Nostrand Co. QD 151.

Reid, "Org. Chem. of Sulfur" (1966), pp. 67–68, vol. VI, Chem. Pub. Co., Inc., New York.

Maurer et al., "Oxid. with $N_2O_4$ etc." (1947), CA 41 pp. 3057–58 (1947).

Abel, The Kinetics of Nutrous Acid as an Oxid" (1949), CA 41, p. 2833 (1950).

Criegee, "Oxid. With Lead Tetraacetat" (1965), CA 66, No. 18395b (1967).

Misono et al., "On the Formation of Benzonitrile From Benzaldehyde and Ammonia Iodine as an Oxidant (1967), CA 68, No. 95087z. (1968).

LEWIS GOTTS, Primary Examiner

G. HOLLRAH, Assistant Examiner